Aug. 19, 1924.
F. C. HUEBER
COVER FOR RADIATORS
Filed Feb. 5, 1923
1,505,709
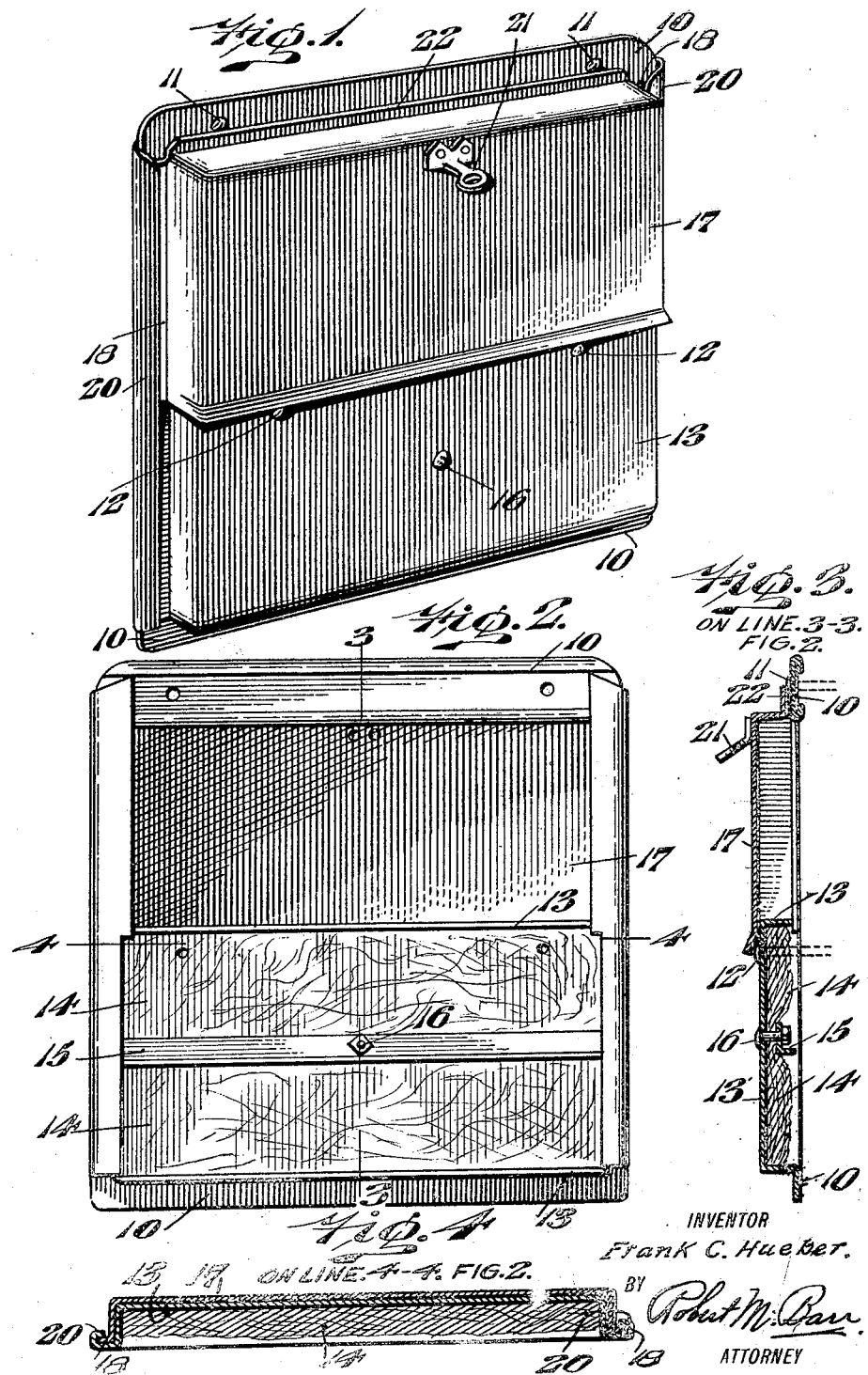
INVENTOR
Frank C. Hueber.
BY
Robert M. Barr.
ATTORNEY Patented Aug. 19, 1924.

1,505,709

UNITED STATES PATENT OFFICE.

FRANK C. HUEBER, OF PHILADELPHIA, PENNSYLVANIA.

COVER FOR RADIATORS.

Application filed February 5, 1923. Serial No. 616,930.

*To all whom it may concern:*

Be it known that I, FRANK C. HUEBER, a citizen of the United States, and a resident of Philadelphia, county of Philadelphia, State of Pennsylvania, have invented certain new and useful Improvements in Covers for Radiators, of which the following is a specification.

Some of the objects of the present invention are to provide an improved protecting device for radiators of automobiles in cold weather; to provide means for excluding cold air from a radiator when an automobile engine is at rest; to provide means for regulating the air to an automobile radiator when the engine of the automobile is running; to provide an improved removable cover for the front of an automobile radiator; to provide a heat retaining means to prevent freezing of the cooling liquid in the radiator of an automobile; and to provide other improvements as will be hereinafter pointed out.

For an illustration of one of various forms the device of the present invention may take, reference is to be had to the accompanying drawings, in which Fig. 1 represents a perspective of a radiator cover embodying one form of the present invention; Fig. 2 represents a rear elevation of the same; Fig. 3 represents a section on line 3—3 of Fig. 2; and Fig. 4 represents a section on line 4—4 of Fig. 2.

Referring to the drawings one form of the invention comprises a frame 10 formed of pressed metal or any other suitable material, the shape of which conforms generally to that of an automobile radiator as seen in front elevation, and has a size substantially of that of the radiator. This frame 10 is arranged to fit flush with the face of an automobile radiator and be rigidly secured thereto by bolts 11 and 12, which pass through the radiator and are secured in the usual manner by nuts or other means whereby the frame 10 can be removed if desired.

For the purpose of reducing the area of the radiator exposed to the air, the lower portion of the frame 10 is provided with a transversely disposed closure 13 which is preferably pressed outward from the frame to form a compartment for the reception of mineral wool 14 or any other suitable insulating material, which as here shown, is held in place by a cross-bar 15 fastened to the closure 13 by a bolt 16 or the like. The closure 13 forms a fixed protecting means for the lower portion of the radiator and thereby prevents freezing of the circulating water, which collects at the bottom of the radiator when the automobile engine is not in operation.

In order to protect the upper portion of the radiator, the frame 10 is provided with a slidable closure or shield 17 having a shape conforming to the contour of the closure 13 and with which it is arranged for telescopic action. The dimensions of the combined closures are such that the face of the radiator is entirely covered when the closure 17 is drawn upward to its limit of movement, so that cold air is excluded from contact with the radiator cells. The closure 17 is provided with two oppositely arranged fins or ribs 18 which seat respectively in channel guides formed by inwardly turned flanges 20 preferably integral with the frame 10, the arrangement being such that the closure 17 can be manually moved from one position to another very easily, but the fit is snug to prevent rattle. A handle 21 is fixed to the closure 17 at the central portion to provide means for raising and lowering the closure as required.

To prevent the closure 17 from being pulled upward out of its guides, it has a vertically disposed flange 22 extending across the top portion which is located to intercept the heads of the bolts 11, so that when the closure is raised to operative position this flange 22 wedges against the bolt heads and holds the closure rigidly in position. Also in this position the lower edge of the closure 17 is held by the heads of the bolts 12. When the closure 17 is to be lowered it can readily be forced down over the bolt heads 12 with a minimum of effort and when released the friction holds the parts against movement or rattling.

In the operation of the device, the closure 17 may be either open or closed under running conditions depending upon the temperature, though normally it will be open and so maintained until the engine comes to rest. Thus when the automobile is left standing, the closure 17 is raised to the position shown in Fig. 1 and the cold air is entirely excluded from the radiator, also the heat of the engine is retained for a considerable period. The use of an insulating material in the lower part of the device serves to effectively protect the water which collects in the lower part of the radiator and maintains the water at a temperature above freezing regardless of outside temperature for the ordinary period an automobile is left standing idle in cold weather.

Having now fully described my invention, what I claim is:—

In a device of the character stated, a frame arranged to be rigidly secured to the front of an automobile radiator and having an opening substantially the size of the radiator opening, fastening means for said frame directly engaging the front of said radiator, a closure fixed to said frame and closing a portion of said opening, said closure being shaped to form an inner receptacle, an insulating material secured in said receptacle and abutting said radiator, a movable cover arranged to close the remaining portion of said opening, said cover being shaped to telescope with said closure to uncover a portion of said opening, and means for supporting said cover in closed position.

Signed at Philadelphia, in the county of Philadelphia and State of Pennsylvania, this 1st day of February, 1923.

FRANK C. HUEBER.